United States Patent

[11] 3,574,276

[72] Inventor  Samuel Strelzoff
                New York, N.Y.
[21] Appl. No. 736,436
[22] Filed    June 12, 1968
[45] Patented Apr. 13, 1971
[73] Assignee Chemical Construction Corporation
              New York, N.Y.

[54] METHOD FOR TRANSPORTING ACETYLENE
    7 Claims, 1 Drawing Fig.

[52] U.S. Cl. .................................................. 62/48,
                          48/190, 62/55, 252/372
[51] Int. Cl. .................................................. F17c 11/00,
                                                          F17d 1/04
[50] Field of Search .................................... 48/190;
                          62/48, 55; 55/64, 65; 252/372

[56]                  References Cited
                  UNITED STATES PATENTS
2,029,120  1/1936  Schilling et al. ..............  55/65
3,071,452  1/1963  Braconier et al. ............  48/190X
3,199,266  8/1965  Quester et al. ................  55/65X Primary Examiner—Joseph Scovzonek
Assistant Examiner—Joseph Scovzonek
Attorney—J. L. Chaboty ABSTRACT: Acetylene is transported from a production site to a distant utilization site by dissolving the acetylene in liquid ammonia at the production site to form a liquid solution, transporting the liquid solution from the production site to the utilization site, and recovering substantially pure acetylene from the liquid solution at the utilization site.

3,574,276
PATENTED APR 13 1971
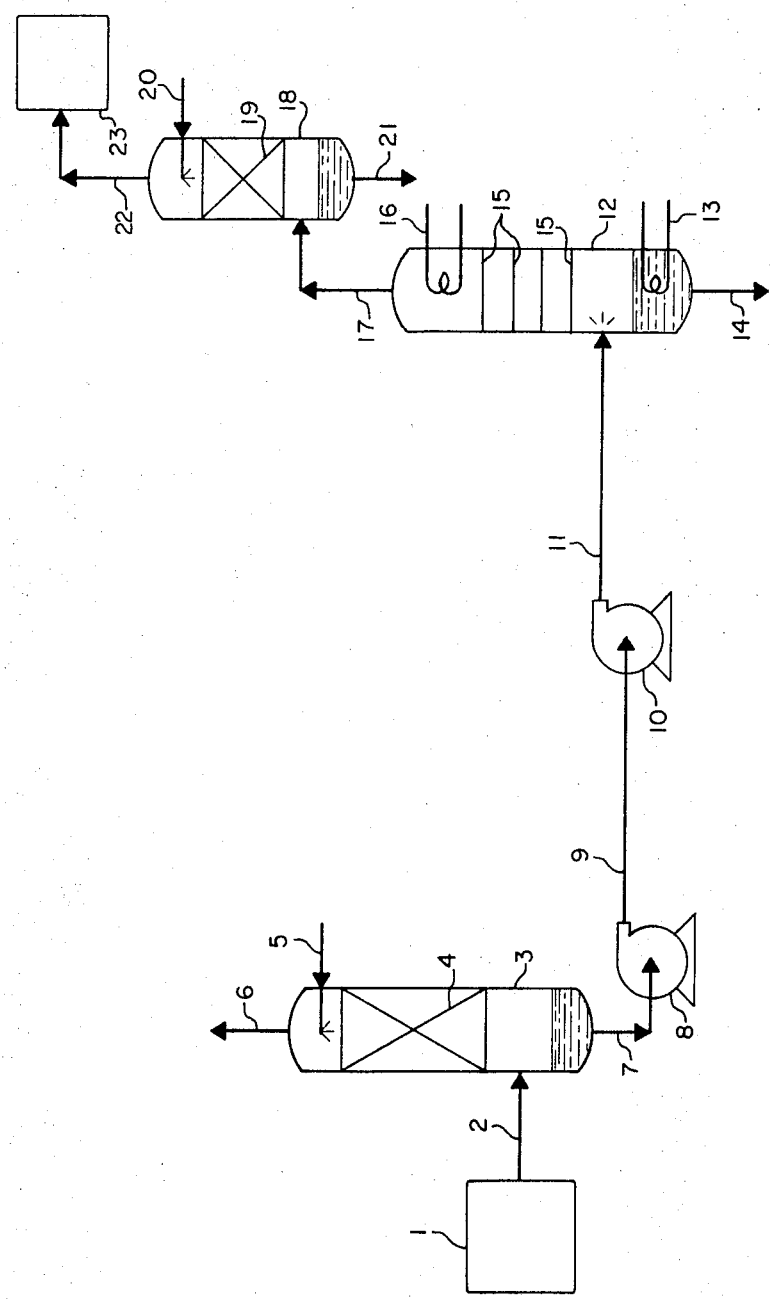
SAMUEL STRELZOFF
INVENTOR.
BY J. T. Chality.
AGENT

METHOD FOR TRANSPORTING ACETYLENE

BACKGROUND OF THE INVENTION

1. Field of the Invention

The invention relates to the transfer of acetylene from a production site at which acetylene is produced in a conventional manner such as by hydrocarbon cracking or the calcium carbide process, to a distant utilization site at which the acetylene is utilized in the production of chemical products such as vinyl chloride, acetic acid, vinyl acetate, or acrylonitrile; or for other purposes.

2. Description of the Prior Art

The transport of acetylene in the gaseous state, and methods of handling acetylene for safe transport, are described in U.S. Pat. Nos. 3,071,452; 3,069,247; and 2,730,438. The recovery of acetylene product from gaseous mixtures is described in U.S. Pat. No. 3,016,985 and British Pat. No. 377,193. Studies and measurements of the characteristics of the acetylene-ammonia system include I and E.C. Process Design and Development I No. 2, Apr. 1968, p. 303—307; "Acetylene, Its Manufacture, Properties and Uses" by S. A. Miller, Vol. I (1965) p. 99, 114, 115; and Russian J. Phys. Chem. 35 (1961) p. 629—634 and p. 2,602—7.

SUMMARY OF THE INVENTION

In the present invention, long-distance transport of acetylene is achieved while avoiding decomposition or explosion of the acetylene, by dissolving or mixing the acetylene in liquid ammonia at the acetylene production site, to form a liquid solution. The liquid solution is pumped through a pipeline or otherwise transported from the production site to an acetylene utilization site, at which the acetylene is to be utilized in the production of finished chemical products or for other purposes. At the utilization site, the liquid solution is distilled or otherwise processed to recover substantially pure acetylene from the liquid solution.

The principal advantage of the invention is that acetylene may be safely transported over a long distance, while avoiding decomposition or explosion, which permits optimum and more economical location of acetylene production sites and facilities as well as optimum economic location of acetylene utilization plants. The invention may be applied to existing liquid ammonia transmission facilities, in which liquid ammonia is currently pumped from production plants located near the source of raw materials for ammonia synthesis, to distant areas in which the ammonia is consumed, as in liquid fertilizer usage or for the manufacture of bulk fertilizer chemicals. Another advantage is that the liquid solution may be safely compressed to elevated pressures during transport, which may not be attained when the acetylene is in the gaseous state.

It is an object of the present invention to provide an improved method for transporting acetylene.

Another object is to provide a method for transporting acetylene at elevated pressure without danger of explosion or decomposition.

A further object is to provide a method for transporting acetylene over long distances by pipeline.

An additional object is to provide a method for transporting gaseous acetylene by dissolving the acetylene in a liquid solution of ammonia, and transporting the liquid acetylene-ammonia solution from a production site to a utilization site.

These and other objects and advantages of the present invention will become evident from the description which follows.

DESCRIPTION OF THE DRAWINGS AND PREFERRED EMBODIMENTS

Referring now to the drawing, a flowsheet of a preferred embodiment of the present invention is illustrated. Acetylene production site 1 consists of any suitable facility for the production of acetylene-rich gas stream 2. Thus, unit 1 may consist of a fluid hydrocarbon cracker utilizing oxygen for partial oxidation cracking followed by a quench, or an electric arc hydrocarbon cracker, or a facility using the calcium carbide process or the Wulff process, or the like. In any case, the acetylene-rich gas stream 2 produced by production site 1 is passed into gas scrubbing and absorption tower 3 below section 4, which consists of any suitable gas-liquid contact means such as a packed section provided with a bed of spherical, ring- or saddle-type packing, or a plurality of sieve trays or bubble cap plates or the like. The rising gas phase in unit 3 is scrubbed in section 4 with liquid ammonia which is admitted into the upper part of unit 3 via stream 5, and suitably dispersed into section 4. The downflowing liquid ammonia absorbs acetylene from the gas phase in section 4, and the residual unabsorbed gas phase stream 6 removed from the top of unit 3 is processed to recover ammonia vapor and other useful components which may be present in stream 6, such as hydrogen and carbon monoxide.

The liquid solution of ammonia containing dissolved acetylene which collects in the bottom of unit 3 is removed via stream 7. The liquid solution stream 7 is now transported to an acetylene utilization site, which may be located at a distance some hundreds or up to a thousand miles or more from the production site 1. In this embodiment of the invention, stream 7 is pumped to the acetylene utilization site at the elevated pressure by pipeline. Stream 7 is passed into pump 8, and the resulting pressurized liquid solution stream 9 discharged from pump 8 is now at a pressure typically in the range of 2 kg./sq.cm. to 50 kg./sq.cm. and a temperature typically in the range of −75° C. to 100° C. Stream 9 flows for an extended distance to pump 10, which increases the solution pressure to compensate for pipeline friction losses. The resulting pressurized liquid solution stream 11 flows for an additional extended distance, to an acetylene utilization site.

At the acetylene utilization site, the acetylene component of stream 11 is separated from the liquid ammonia. Acetylene may be separated from stream 11 in a purified state by an extensive reflux distillation procedure, based on relative volatilities of acetylene and ammonia, however in this embodiment of the invention the separation is attained by producing a vapor stream rich in acetylene and containing residual ammonia, which is scrubbed with water to selectively remove ammonia and produce substantially pure acetylene. Stream 11 is discharged from the long-distance pipeline at the acetylene utilization site, by passing stream 11 into reflux-stripping tower 12, which is located at the acetylene utilization site and which is maintained with a relatively low internal operating pressure, usually below 2 kg./sq.cm. A portion of stream 11 is immediately vaporized in unit 12, and the residual liquid phase which collects in the bottom of unit 12 is rich in ammonia and only contains a small proportion of acetylene. The liquid phase in the bottom of unit 12 is heated by heating coil 13, to vaporize residual acetylene, and substantially pure liquid ammonia is withdrawn from the bottom of unit 12 via stream 14 and passed to suitable utilization, as in the production of bulk fertilizer products such as urea or ammonium nitrate.

The rising vapor phase in unit 12 flows upwards through bubble cap reflux plates 15, and the vapor phase is enriched in acetylene content by gas-liquid contact on plates 15 and condensation of an ammonia-rich phase. The vapor phase flowing to the upper part of unit 12 is cooled by cooling coil 16, to produce partial condensation and a condensed liquid phase for reflux on plates 15.

An acetylene-rich gas phase containing a small proportion of residual ammonia vapor is removed from the top of unit 12 via stream 17, which usually contains less than about 10 percent ammonia content by volume. Stream 17 is passed into water-scrubbing tower 18 below section 19, which usually consists of a packed section and may have a configuration similar to section 4 described supra. A liquid scrubbing solution usually consisting of water is passed into unit 18 above section 19 via stream 20, which flows downwards through section 19 and selectively absorbs ammonia vapor from the rising gas phase. The resulting liquid solution which collects in the bottom of unit 18 consists of an aqueous ammonia solution, which is withdrawn via stream 21 and passed to utilization in a manner similar to stream 14 described supra. A substantially pure acetylene gas stream 22 is withdrawn from the top of unit 18 and passed to utilization in process unit 23, which consists of an acetylene utilization site for the production of vinyl derivatives, acetic acid, acrylonitrile or the like.

Numerous alternatives within the scope of the present invention will occur to those skilled in the art, besides those mentioned supra. The ranges of process variables such as temperature and pressure enumerated supra constitute preferred embodiments of the invention for optimum utilization of the method concepts, and the invention may be practiced outside of these ranges in suitable instances. Stream 2 may consist of substantially pure acetylene gas, in which case stream 6 would consist essentially of ammonia vapor, which could be processed by refrigeration or the like, to condense liquid ammonia for recycle via stream 5. In some instances stream 2 may contain a liquid phase or consist entirely of liquid acetylene. In this case, unit 3 will contain a suitable mixing means to mix the liquid acetylene and liquid ammonia phases and provide a uniform liquid solution or mixture. Stream 7 may be transported to the acetylene utilization site by other suitable means besides pumping stream 7 through a pipeline at elevated pressure. Thus, in some cases stream 7 may be transported by barge or tank car. As mentioned supra, stream 11 may be processed in any suitable manner at the acetylene utilization site, to provide desorption of gaseous acetylene at the utilization site. Thus, stream 11 could be processed by conventional multiple-tray distillation, to separate substantially pure gaseous acetylene overhead from substantially pure liquid ammonia bottoms. In some instances, all of the liquid ammonia discharged via stream 14 at the acetylene utilization site may not be needed or further utilized, and a portion or all of stream 14 may be recycled via stream 5.

An example of an industrial application of the method of the present invention will now be described.

EXAMPLE

The method of the present invention was applied to the design of a 50 tons/day acetylene plant, to be located adjacent to a 1,000 tons/day ammonia plant, with the product liquid ammonia from the ammonia plant to be transported by pipeline for a distance of about 500 miles to an agricultural area requiring nitrogenous fertilizers. Following are the flow rates and operating conditions for principal process streams. Auxiliary refrigeration, not shown, was provided in the actual plant design.

| Stream No. | Flow rate of component kg./hr. Ammonia | Flow rate of component kg./hr. Acetylene | Temp., °C. | Pressure, kg./sq. cm. |
|---|---|---|---|---|
| 2[1] | | 1,893 | 30 | 4.7 |
| 5 | 37,900 | | −40 | 4.5 |
| 6 | 2,800 | | −39 | 4.3 |
| 7 | 35,100 | 1,893 | −36 | 4.2 |
| 9 | 35,100 | 1,893 | −36 | 14.5 |
| 14 | 32,000 | | 23 | 4.2 |
| 17 | 3,100 | 1,893 | 55 | 3.8 |
| 21 | 3,100 | | 45 | 2.4 |
| 22 | | 1,893 | 41 | 2.3 |

[1] Net purified acetylene derived from impure raw gas containing 9% acetylene from which interfering impurities were removed.

I claim:

1. In the method of transporting acetylene from an acetylene production site to an acetylene utilization site in which acetylene is dissolved in liquid ammonia at said production site, whereby a liquid solution of acetylene in liquid ammonia is formed at said production site, acetylene is transported together with ammonia from said production site to said utilization site, and ammonia is separated from said acetylene at said utilization site, the improvement which comprises:
   a. transporting said liquid solution of acetylene dissolved in liquid ammonia from said production site to said utilization site without vaporization; and
   b. recovering substantially pure gaseous acetylene from the transported liquid solution at said utilization site.

2. The method of claim 1, in which said liquid solution is transported from said production site to said utilization site according to step (a) without vaporization by pumping said liquid solution through a pipeline at elevated pressure, said pipeline extending from said production site to said utilization site.

3. The method of claim 1, in which substantially pure gaseous acetylene is recovered from said liquid solution at said utilization site according to step (b) by distilling acetylene from said liquid solution.

4. The method of claim 1, in which said liquid solution is formed at a temperature in the range of −75° C. to 100° C., and said liquid solution is transported according to step (a) at a pressure in the range of 2 kg./sq.cm. to 50 kg./sq.cm.

5. In the method of transporting acetylene from an acetylene production site to an acetylene utilization site in which a gaseous acetylene-containing stream is produced at said production site, said gaseous acetylene-containing stream is scrubbed with liquid ammonia at said production site, whereby gaseous acetylene is dissolved in liquid ammonia at said production site and a liquid solution of acetylene in liquid ammonia is formed at said production site, acetylene is transported together with ammonia from said production site to said utilization site, and ammonia is separated from acetylene at said utilization site, the improvement which comprises:
   a. pumping said liquid solution through a pipeline without vaporization and at an elevated pressure in the range of 2 kg./sq.cm. to 50 kg./sq.cm., said pipeline extending from said production site to said utilization site, whereby said liquid solution is transported from said production site to said utilization site without vaporization; and
   b. recovering substantially pure gaseous acetylene from said liquid solution at said utilization site.

6. The method of claim 5, in which substantially pure gaseous acetylene is recovered from said liquid solution at said utilization site according to step (b) by distilling acetylene from said liquid solution.

7. The method of claim 5, in which said liquid solution is pumped through said pipeline without vaporization according to step (a) at a temperature in the range of −75° C. to 100° C.